(12) United States Patent
Nigen-Chaidron et al.

(10) Patent No.: US 7,811,372 B2
(45) Date of Patent: Oct. 12, 2010

(54) REJUVENATING AGENT AND PROCESS FOR RECYCLING OF ASPHALT

(75) Inventors: Sophie Nigen-Chaidron, Petit Couronne (FR); Laurent Porot, Petit Couronne (FR)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 12/522,180

(22) PCT Filed: Jan. 4, 2008

(86) PCT No.: PCT/EP2008/050065

§ 371 (c)(1),
(2), (4) Date: Aug. 18, 2009

(87) PCT Pub. No.: WO2008/084014

PCT Pub. Date: Jul. 17, 2008

(65) Prior Publication Data

US 2010/0041798 A1  Feb. 18, 2010

(30) Foreign Application Priority Data

Jan. 8, 2007 (EP) .................................. 07290020

(51) Int. Cl.
*C08L 95/00* (2006.01)

(52) U.S. Cl. .......................... 106/278; 524/59; 524/68; 524/70; 524/71

(58) Field of Classification Search ................. 106/278; 524/59, 68, 70, 71
See application file for complete search history.

(56) References Cited

U.S. PATENT DOCUMENTS

2002/0026884 A1  3/2002  Raad .......................... 106/244
2010/0034586 A1 * 2/2010  Bailey et al. .................. 404/75

FOREIGN PATENT DOCUMENTS

| EP | 1491684 | 12/2004 |
| EP | 1696002 | 8/2006 |
| WO | WO9735940 | 10/1997 |

\* cited by examiner

*Primary Examiner*—Peter Szekely
(74) *Attorney, Agent, or Firm*—Charles W. Stewart

(57) ABSTRACT

A rejuvenating agent having a viscosity of from 200 to 60000 cSt at 60° C. and comprising 10-90 weight % palm oil and 90-10 weight % bitumen, where the percentages are based upon the total weight of the composition, is disclosed. The rejuvenating agent is suitable for use in hot in-place and hot in-plant recycling processes.

44 Claims, No Drawings

REJUVENATING AGENT AND PROCESS FOR RECYCLING OF ASPHALT

The present application claims priority from European Patent Application 07290020.2 filed 8 Jan. 2007.

FIELD OF THE INVENTION

The invention relates to a bituminous rejuvenating agent and a process for recycling asphalt using the bituminous rejuvenating agent.

BACKGROUND OF THE INVENTION

Asphalt pavements deteriorate over time due to the impact of traffic, water and sunlight. The deterioration in pavement quality can lead to permanent deformation or rutting, cracking or brittleness and can lead to inferior skid resistance. The deterioration is evident from a decrease in penetration value (for example measured at 25° C. in accordance with EN 1426 or ASTM D5-97) and an increase in softening point (for example measured using the Ring and Ball technique in accordance with EN 1427 or ASTM D36-95).

Recycling techniques offer a means of recovering desirable pavement properties without replacing the entire pavement with new materials. Additionally they enable reuse of production waste from the asphalt pavement industry. Recycling asphalt pavements has the advantages of decreasing the demand for natural resources, decreasing the production of waste material and reducing costs. Desirably the amount of the asphalt pavement that is recycled is maximised and the amount of new material that is added to the recovered asphalt is minimised.

Reclaimed asphalt pavement (known as RAP) can be recycled "in-place" (i.e. at the road location), or can be recycled "in-plant" (i.e. the RAP is removed from the road surface and transported to an asphalt mix plant). In a hot in-place recycling process, the existing pavement is reheated and milled and virgin aggregate and a rejuvenating agent are added to the RAP. This process is primarily used for resurfacing the top layer of a pavement and can re-use up to 100% of the RAP. In a hot in-plant recycling process, the RAP is broken and milled, and virgin aggregate, a rejuvenating agent and, in some instances, fresh bitumen are added. The in-plant process may be used for the construction of new base layers, but it can be difficult to incorporate a high level of RAP into the final product at the date of the invention due to constraints of the asphalt mix plant, and typically the final product consists of up to about 50% PAP.

The function of the rejuvenating agent (also known as a recycling agent) is to modify the properties of the aged binder contained in the RAP so that the recycled asphalt has properties resembling those of the original asphalt. It may not be possible to restore the asphalt to its former state, but it should be possible to significantly improve those properties that have been subject to deterioration.

A rejuvenating agent that is commonly used is a low viscosity product obtained from crude oil distillation. The present inventors have sought to provide an alternative rejuvenating agent, and have sought to provide an agent wherein at least a proportion of the agent is a natural product of plant origin. Incorporating a plant product instead of a petroleum product offers a potentially more sustainable product, and may lead to price and supply advantages. The natural-product based rejuvenating agent must have the required technical properties and in use should be safe and easy to handle.

EP 1 491 684 describes a process for the renovation of road surfacings wherein the old surface is removed, the moisture content is adjusted and a binder is added in the cold state. The binder and RAP are mixed and then rolled to form the renovated surfacing. The binder consists of at least bitumen and animal or vegetable oil. In the preferred embodiment, the binder contains 10 wt % of rapeseed oil, 60 wt % of bitumen and 30 wt % of polymer bitumen. The binder described in EP 1 491 684 has been formulated specifically for use in cold in-place recycling, a process which is primarily used to recycle the base layer of low to medium trafficked roads. By contrast, hot recycling processes can be used to rejuvenate the surface layers of roads.

In a thesis entitled "The Use of Palm Oil Products to Modify and Rejuvenate Bitumens" by Hasanan bin Md. Nor, submitted to the Faculty of Civil Engineering at the Universiti Teknologi Malaysia in 1994, the use of palm olein and palm kernel olein as rejuvenating agents is described. Palm oil is oil obtained from the flesh of the fruit of the oil palm. Palm kernel oil is oil obtained from the kernel of the oil palm fruit. Palm olein and palm kernel oleins are obtained after crystallisation of palm oil and palm kernel oil, respectively, at a controlled temperature. In the recommendations of the thesis it is recommended to use oleins with fresh bitumen or polymer-modified bitumen in processes for recycling asphalt.

The present inventors have sought to provide an alternative rejuvenating agent that comprises a plant-based product and that can be used in hot in-place and in-plant recycling processes.

SUMMARY OF THE INVENTION

Accordingly, the present invention provides a rejuvenating agent having a viscosity of from 200 to 60000 cSt ($2\times10^{-4}$ to $6\times10^{-2}$ m$^2$s$^{-1}$) at 60° C. (as measured according to EN 13302) and comprising 10-90 weight % palm oil and 90-10 weight % bitumen, where the percentages are based upon the total weight of the composition.

The rejuvenating agent is suitable for use in a hot in-place recycling process, so the present invention further provides a process for recycling an asphalt pavement comprising steps of:

a) heating and milling the asphalt pavement;

b) heating a rejuvenating agent according to the invention;

c) adding the hot rejuvenating agent and, optionally, aggregate to the milled asphalt pavement and mixing to provide rejuvenated asphalt and d) forming a rejuvenated asphalt pavement with the rejuvenated asphalt.

The rejuvenating agent is also suitable for use in a hot in-plant recycling process, so the present invention further provides a process for recycling reclaimed asphalt pavement comprising steps of:

a) heating virgin aggregate, heating a rejuvenating agent according to the invention and, optionally, heating fresh bitumen; and b) adding the hot rejuvenating agent, the hot virgin aggregate and, optionally, the hot bitumen to reclaimed asphalt pavement; and mixing to provide rejuvenated asphalt.

The present inventors have found that palm oil-containing rejuvenating agent can be advantageously used in hot in-place and in-plant recycling processes. The rejuvenating agent offers a more sustainable and lower cost alternative than a wholly oil-product based rejuvenating agent.

DETAILED DESCRIPTION OF THE INVENTION

Bitumen is a viscous liquid or a solid consisting essentially of hydrocarbons and their derivatives. It is soluble in trichloroethylene and softens gradually when heated. Bitumen may be combined with aggregate to provide asphalt. The term "asphalt" in the present description is used to describe a mixture of bitumen and aggregate.

The rejuvenating agent has a viscosity of from 200 to 60000 cSt ($2\times10^{-4}$ to $6\times10^{-2}$ m$^2$s$^{-1}$) at 60° C. The viscosity should be measured according to the EN 13302 standard. A rejuvenating agent having viscosity above 60000 cSt is not useful because a significant quantity of rejuvenating agent is required to modify the properties of the RAP and the proportion of recycled material in the rejuvenated asphalt is resultingly low. Decreasing the viscosity of the rejuvenating agent decreases the amount of rejuvenating agent that is required to rejuvenate a particular quantity of RAP, and is also likely to mitigate or eliminate the requirement for the addition of virgin aggregate. Rejuvenating agents having a viscosity below 200 cSt are unlikely to be useful because they are unlikely to contain sufficient quantities of advantageous chemical components and are therefore unlikely to achieve the desired improvement in asphalt properties.

The preferred viscosity of the rejuvenating agent will depend upon its intended application: lower viscosity rejuvenating agents are preferred for in-place recycling and higher viscosity rejuvenating agents are preferred for in-plant recycling. The rejuvenating agent of the present invention can have a wide range of viscosities (e.g. by varying the ratio of palm oil to bitumen), thereby providing rejuvenating agents that are suitable for use in different applications, specifically hot in-place and in-plant recycling.

For hot in-place recycling, preferably the viscosity of the rejuvenating agent is above 350 cSt, most preferably above 400 cSt. Preferably the viscosity of the rejuvenating agent is below 750 cSt, most preferably below 600 cSt. A most preferred viscosity range is 400 to 600 cSt.

For hot in-plant recycling, preferably the viscosity of the rejuvenating agent is above 4000 cSt. Preferably the viscosity of the rejuvenating agent is below 60000 cSt. A most preferred viscosity range is 4000 to 40000 cSt adapted to the final use of asphalt mix.

The rejuvenating agent comprises 10-90 weight % palm oil. Palm oil is a plant oil obtained from the fruit of the oil palm tree. By contrast with the processes disclosed in the aforementioned thesis by Hasanan bin Md. Nor, the processes of the invention use a rejuvenating agent comprising palm oil rather than a palm oil derivative such as palm olein. As disclosed in the thesis, the physical characteristics of palm olein differ significantly from those of palm oil. It is preferred to use refined, bleached, deodorised (RBD) palm oil because this does not release any odour during the recycling process. It is preferred to maximise the amount of palm oil in the rejuvenating agent because palm oil is a readily available and inexpensive plant product. However, less than 90 wt % of palm oil must be used because palm oil has low viscosity and higher than 90 wt % of palm oil is unlikely to provide a rejuvenating agent with a viscosity in the required range (palm oil typically has a very low viscosity, e.g. around 20 cSt, $2\times10^{-5}$ m$^2$s$^{-1}$) and because palm oil does not contain all the advantageous chemical compounds that are provided by the bitumen. Preferably the rejuvenating agent comprises at least 20 wt % palm oil, more preferably at least 30 wt % and most preferably at least 40 wt %. Preferably the rejuvenating agent comprises less than 80 wt % palm oil, more preferably less than 70 wt % and most preferably less than 60 wt %. A preferred range of palm oil content is from 40 to 60 wt %.

The rejuvenating agent comprises 10-90 weight % bitumen. The bitumen may be any conventional type of bitumen, including polymer-modified bitumen, chemically modified bitumen and blends with short residues. The penetration value of the bitumen is preferably from 10 to 300¹⁄₁₀ mm at 25° C. (measured in accordance with EN 1426). Most preferably the penetration value of the bitumen is from 50 to 100¹⁄₁₀ mm at 25° C. If the penetration value is higher than 100¹⁄₁₀ mm then a higher proportion of bitumen compared to palm oil will be required to produce a rejuvenating agent with a viscosity in the required range, and this precludes the possibility of a rejuvenating agent with a high palm oil content. To provide a rejuvenating agent with a viscosity in the required range, there must be a balance between the penetration value of the bitumen and the amount of bitumen in the rejuvenating agent. Bitumen (especially bitumen with lower penetration values) is very viscous, so if a low penetration bitumen is used, less bitumen will probably be required and if a high penetration bitumen is used, more bitumen will probably be required. Generally, lower proportions of bitumen in the rejuvenating agent are preferred because of the desire to maximise the amount of plant-derived products in the rejuvenating agent. However, more than 10 wt % of bitumen is required to provide the required viscosity and to provide sufficient quantities of advantageous chemical components to achieve the desired improvement in asphalt properties. Preferably the rejuvenating agent comprises at least 20 wt % bitumen, more preferably at least 30 wt % and most preferably at least 40 wt %. Preferably the rejuvenating agent comprises less than 80 wt % bitumen, more preferably less than 70 wt % and most preferably less than 60 wt %. A preferred range of bitumen content is from 40 to 60 wt %.

The rejuvenating agent may be combined with a polymer. Compositions comprising rejuvenating agent combined with polymer are likely to be particularly effective for recycling polymer-modified bitumen. Preferably the polymer is of a type found in polymer-modified bitumen. Preferred polymers are thermoplastic elastomers or plastomers, for example styrenic block copolymers, olefinic copolymers, polyurethane and polyether-polyester copolymers. The styrenic block copolymers are most preferred and examples include styrenebutadiene-styrene (SBS) and styrene-isoprene-styrene (SIS). The amount of polymer in the composition is preferably from 3 to 15 wt %, based upon the weight of the composition.

The rejuvenating agent may comprise further components such as low viscosity products from the distillation of crude oil. However, it is preferred that these are minor components in the rejuvenating agent and preferably they do not comprise more than 10 wt % each. In a preferred embodiment of the invention, 90 wt % of the rejuvenating agent consists of palm oil and bitumen, more preferably 95 wt % of the rejuvenating agent consists of palm oil and bitumen.

The rejuvenating agents are prepared by blending processes wherein the palm oil, bitumen and other components are combined together. A typical blending process would consist of heating bitumen to about 170° C., adding palm oil at ambient temperature and blending for about 90 minutes until a homogeneous product is obtained.

The hot in-place recycling process of the present invention uses techniques and apparatus known to the skilled person to heat and mill an asphalt pavement. The amount of rejuvenating agent added to the milled asphalt pavement is preferably in the range of 0.2-2 wt %, based upon the weight of the final rejuvenated asphalt mix. Adding less than 0.2 wt % of rejuvenating agent is unlikely to achieve sufficient modification of the properties of the asphalt. Adding more than 2 wt % decreases the proportion of the rejuvenated pavement that is recycled. The rejuvenating agent is preferably heated to a temperature at which its viscosity is sufficient to achieve coating of the aggregates in the final asphalt mixture.

The milled asphalt pavement, rejuvenating agent and, optionally, virgin aggregate are mixed using standard techniques and apparatus and are formed into a rejuvenated asphalt pavement using standard techniques and apparatus.

The hot in-plant recycling process of the present invention uses techniques and apparatus known to the skilled person to mill the reclaimed asphalt pavement and to heat the reclaimed asphalt pavement, the virgin aggregate, the rejuvenating agent and any bitumen that is used. The reclaimed asphalt pavement may be material from road milling, waste from asphalt pavement production or any other source of material containing bitumen or a mix of aggregate and bitumen. The proportions of reclaimed asphalt pavement, virgin aggregate and rejuvenating agent (plus any fresh bitumen) are preferably within the following ranges:

RAP: 10-50 wt %
Virgin aggregate: 90-50 wt %
Rejuvenating agent plus any fresh bitumen: 2-6%

(All weight percentages are based upon the total weight of the components making up the rejuvenated asphalt mix.)

It is preferred to maximise the proportion of reclaimed material (RAP) in the rejuvenated asphalt, but in practice it is currently difficult to achieve higher than 50 wt % RAP content during hot in-plant recycling because of specific design of the asphalt mixing plants.

The RAP is preferably not directly heated during the process as this may burn the bitumen, and is preferably heated by transfer of heat from hot aggregate and hot rejuvenating agent. However, in some embodiments of the invention the RAP may be heated to 140° C. The rejuvenating agent is preferably heated to a temperature at which its viscosity is sufficient to achieve coating of the aggregates in the milled asphalt pavement. The virgin aggregate is preferably heated to a temperature of 160 to 180° C.

The components are mixed using standard techniques and apparatus and the rejuvenated asphalt mix can be used for the same purposes as standard asphalt mix.

The current invention could also be used for hot in-plant recycling with higher amounts of RAP reuse (above 50%), when the design of these plants will allow it.

The present invention further provides a rejuvenated asphalt pavement produced by a process according to the invention and provides rejuvenated asphalt produced by a process according to the invention.

The invention will now be described by reference to examples which are not intended to be limiting of the invention.

Preparation of Rejuvenating Agents Using Different Amounts of Palm Oil and Different Grades of Bitumen Bitumen was heated to 170° C. in an oven. Two different grades, both from Shell's Petit Couronne refinery, were used: 50/70 grade bitumen having a penetration as measured by EN 1426 of 60 1/10 mm at 25° C. and a softening point as measured by EN 1427 of 48.9° C., and 10/20 grade bitumen having a penetration as measured by EN 1425 of 18 1/10 mm at 25° C. and a softening point as measured by EN 1427 of 66.0° C. Refined, bleached, deodorised (RBD) palm oil (having a viscosity as measured by EN 13302 at 60° C. of 22 cSt) at ambient temperature was added to the bitumen. The bitumen and palm oil were blended at a temperature of 170° C. using a conventional laboratory stirrer/mixer for 90 minutes at which point the product was homogeneous.

The ratio of bitumen to palm oil and the grade of bitumen were varied in order to obtain rejuvenating agents of different viscosity. Viscosity was measured in accordance with EN 13302 (with a rotating spindle apparatus); this is dedicated to low viscosity measurements of complex fluids (at relatively high temperatures for bituminous products). Table 1 shows the viscosity of nine rejuvenating agents that were prepared:

TABLE 1

|  | Weight % bitumen 50/70 | Weight % bitumen 10/20 | Weight % palm oil | Viscosity (cSt) at 60° C. |
| --- | --- | --- | --- | --- |
| Example 1 | 66 | 0 | 34 | 1040 |
| Example 2 | 57.3 | 0 | 42.7 | 420 |
| Example 3 | 57.3 | 0 | 42.7 | 500 |
| Example 4 | 50.4 | 0 | 49.6 | 260 |
| Comparative Example 1 | 97 | 0 | 3 | Could not measure |
| Example 5 | 90 | 0 | 10 | 23700 |
| Example 6 | 75 | 0 | 25 | 3070 |
| Example 7 | 20 | 0 | 80 | 600 |
| Example 8 | 0 | 50 | 50 | 490 |

In these examples, adding palm oil from 10 wt % to 80 wt % to a bitumen of penetration 60 1/10 mm lead to rejuvenating agents with viscosity between 23700 and 260 cSt. Adding only 3 wt % of palm oil to a bitumen of penetration 60 1/10 mm at 25° C. provided a rejuvenating agent outside the scope of the invention, having a viscosity higher than could be measured (and higher than 60,000 cSt). Adding 50 wt % palm oil to a bitumen of penetration 18 1/10 mm at 25° C. lead to a rejuvenating agent having a viscosity of 490 cSt.

Preparation of Composition Comprising Rejuvenating Agent and Polymer

A composition was prepared by blending a 160/220 grade bitumen (having a penetration as measured by EN 1426 of 162 1/10 mm at 25° C. and a softening point as measured by EN 1427 of 41° C.), palm oil and a styrene-butadiene-styrene (SBS) block copolymer. The bitumen and palm oil were placed in an oven and heated for 30 minutes at 140° C., and then transferred to a container on a hot plate and mixed at low shear for 30 minutes at 140° C. Once a homogeneous blend was obtained, the temperature was increased to 180° C. and SBS in powder form was added. The blend was mixed at low shear for 2 hours at 180° C. The proportions of the components in the composition were 69 wt % bitumen, 20 wt % palm oil and 11 wt % SBS. The penetration (measured in accordance with EN 1426) was 137 1/10 mm and the softening point (measured in accordance with EN 1427) was 90.5° C. The viscosity (in accordance with EN 13302) at 100° C. is 13.8 Pa·s for a shear rate of 150 $s^{-1}$, and the viscosity at 120° C. is 4.2 Pa·s for a shear rate of 150 $s^{-1}$.

Rejuvenation of Aged Bitumen

Bitumen (50/70 grade bitumen from Shell's Petit Couronne refinery having a penetration as measured by EN 1426 of 60 1/10 mm and a softening point as measured by EN 1427 of 48.9° C.) was aged in laboratory using the Rolling Thin Film Oven Test (RTFOT) according to the EN 12607-1 method, followed by Pressure Ageing Vessel (PAV) according to the AASHTO R28-02 method. Such methods intend to simulate ageing occurring during mixing and laying process of asphalt mixture for RTFOT and long term ageing under road conditions for PAV. A rejuvenating agent containing 42.7% of palm oil and 57.3% of bitumen with penetration value of 60 1/10 mm and softening point of 48.9° C. was prepared as described above. The fully aged bitumen (bitumen subjected to RTFOT and PAV) was heated to 170° C. and the rejuvenating agent was added at ambient temperature. The fully aged bitumen and the rejuvenating agent were blended while kept at 160° C. for 45 min at which point the product was homogeneous.

The resulting rejuvenated bitumen was fully characterised to compare its properties to those of the fresh initial bitumen. The consistency at ambient temperature and the consistency at high temperature were assessed by measuring the penetration value at 25° C. (according to the EN1426 method) and the softening point (according to the EN1427 method). Measurements were taken on the fresh bitumen and on the fresh rejuvenated bitumen and also after RTFOT (according to EN 12607-1) and then after PAV (according to AAHSTO R28-02). Table 2 shows the full results and the European specification values for 50/70 bitumen.

TABLE 2

| Product | Weight % of bitumen | Weight % of rejuvenating agent | Age | Pen @25° C. EN1426 (1/10 mm) | R&B EN1427 (° C.) |
|---|---|---|---|---|---|
| 50/70 European Specification | | | Fresh | 50-70 residual value >55 | 46-54 |
| | | | RTFOT | % | — |
| | | | PAV | — | — |
| 50/70 bitumen | 100 | | Fresh | 60 | 48.9 |
| | | | RTFOT | 39 | 57.6 |
| | | | PAV | 23 | 64.7 |
| Rejuvenated bitumen | 87 | 13 | Fresh | 50 | 55.6 |
| | 86 | 14 | Fresh | 53 | 56.0 |
| | 84 | 16 | Fresh | 58 | 54.6 |
| | | | RTFOT | 49 | 59.2 |
| | | | PAV | 28 | 75.8 |

In these examples the rejuvenation of fully aged binder with a rejuvenating agent made up of 42.7% of palm oil and 57.3% of 60 pen bitumen leads to recovery of the initial properties of a fresh bitumen as classified in 50/70 grade specification.

Rejuvenation of Bitumen with Composition Comprising Rejuvenating Agent and Polymer Bitumen (50/70 grade bitumen from Shell's Petit Couronne refinery having a penetration as measured by EN 1426 of 60 1/10 mm at 25° C. and a softening point as measured by EN 1427 of 48.9° C.) was aged by RTFOT and PAV. A composition containing 69 wt % bitumen, 20 wt % palm oil and 11 wt % SBS with penetration value of 137 1/10 mm and softening point of 90.5° C. was prepared as described above. The rejuvenating agent was heated to 180° C. in an oven and the fully aged bitumen was added. The fully aged bitumen and the rejuvenating agent were mixed while kept at 180° C. for 45 min.

The penetration at 25° C. (according to EN1425), softening point (according to EN1427) and elastic recovery at 25° C. (according to EN 13398) of the rejuvenated bitumen were measured. Table 3 shows the full results.

TABLE 3

| Product | Weight % of bitumen | Weight % of composition comprising rejuvenating agent and polymer | Age | Pen @25° C. EN1426 (1/10 mm) | R&B EN1427 (° C.) | Elastic Recovery @ 25° C. (%) |
|---|---|---|---|---|---|---|
| 50/70 bitumen | 100 | | Fresh | 60 | 48.9 | |
| | | | RTFOT | 39 | 57.6 | |
| | | | PAV | 23 | 64.7 | |
| Rejuvenated bitumen | 75 | 25 | Fresh | 47 | 60 | 74 |
| | | | RTFOT | 38 | 65.6 | 68 |

In this example the rejuvenation of fully aged conventional binder with a composition comprising rejuvenating agent and polymer leads to a rejuvenated bitumen having the properties of a fresh polymer-modified bitumen.

Rejuvenating Effect on Aged Asphalt Mix

Three asphalt mixtures were considered in this study:

Comparative asphalt 1: A reference asphalt mixture.

Comparative asphalt 2: An "aged mixture" rejuvenated with a rejuvenating agent consisting of a low viscosity product obtained from crude oil distillation.

Example asphalt 1: An "aged mixture" rejuvenated with the rejuvenating agent of the invention.

The selected asphalt mixture type for all three asphalt mixtures was a French BBSG 0/14 (Béton Bitumineux semi-Grenus), which displays a continuous grading curve and is made from five aggregate fractions. The binder content was 5% by weight of binder in the total weight of the mixture.

The reference mixture (comparative asphalt 1) was used to prepare the two aged mixtures. The mixture was aged in a loose state in an oven at 80° C. for 7 days after a maturation period of 2 hours at the mixing temperature. This aged mixture is considered to have similar properties to RAP.

The rejuvenation consisted of reheating the aged mixture and mixing with addition of the rejuvenating agent without any addition of new virgin aggregates. The amount of rejuvenating added was 16.4% for comparative asphalt 2 and 16.0% for example asphalt 1. From these different mixtures, extraction and recovery of bitumen was performed by a rotary vacuum evaporator method. The recovered bitumen samples were then characterised by measuring the penetration at 25° C. according to EN1426 and softening point according to EN1427. Table 4 shows the results obtained for the 3 different asphalt mixtures.

TABLE 4

|  | Penetration at 25° C. EN 1426 (1/10 mm) | Softening Point EN 1427 (° C.) |
|---|---|---|
| Comparative Asphalt 1 | 33 | 56.8 |
| Comparative Asphalt 2 | 51 | 52.7 |
| Example Asphalt 1 | 45 | 57 |

For Comparative Asphalt 2 and Example Asphalt 1, the rejuvenating agents successfully rejuvenated the bitumen from the aged asphalt mixture. The use of the rejuvenating agent of the invention lead to a rejuvenated binder presenting properties closer to the initial binder than the use of the rejuvenating agent consisting of a low viscosity product obtained from crude oil distillation.

What is claimed is:

1. A process for recycling an asphalt pavement, wherein the process comprises the steps of:
    a) heating and milling the asphalt pavement to provide a milled asphalt pavement;
    b) heating a rejuvenating agent or a composition comprising a rejuvenating agent and a polymer selected from the group consisting of styrenic block copolymers, olefinic copolymers, polyurethane and polyether-polyester copolymers, wherein the rejuvenating agent has a viscosity of from 200 to 60000 cSt ($2 \times 10^{-4}$ to $6 \times 10^{-2}$ $m^2 s^{-1}$) at 60° C. and comprises 10-90 weight % palm oil and 90-10 weight % bitumen, where the weight percentages are based upon the total weight of the composition to provide either a hot rejuvenating agent or a hot composition;
    c) adding either the hot rejuvenating agent or the hot composition to the milled asphalt pavement and mixing to provide a rejuvenated asphalt mix; and
    d) forming a rejuvenated asphalt pavement with the rejuvenated asphalt mix.

2. A process according to claim 1, wherein the amount of rejuvenating agent added to the milled asphalt pavement is in the range of from 0.2 to 2 wt %, based upon the weight of the rejuvenated asphalt mix.

3. A process for recycling a reclaimed asphalt pavement, wherein the process comprises the steps of:
    milling the reclaimed asphalt pavement to provide a milled asphalt pavement; heating virgin aggregate;
        heating a rejuvenating agent or a composition comprising a rejuvenating agent and a polymer selected from the group consisting of styrenic block copolymers, olefinic copolymers, polyurethane and polyether-polyester copolymers, wherein the rejuvenating agent has a viscosity of from 200 to 60000 cSt ($2 \times 10^{-4}$ to $6 \times 10^{-2}$ $m^2 s^{-1}$) at 60° C. and comprises 10-90 weight % palm oil and 90-10 weight % bitumen, where the percentages are based upon the total weight of the composition to provide either a hot rejuvenating agent or a hot composition; and
        adding either the hot rejuvenating agent or the hot composition and the hot virgin aggregate the milled reclaimed asphalt pavement and mixing to provide a rejuvenated asphalt mix.

4. A process according to claim 3, wherein the rejuvenated asphalt mixture comprises an amount of reclaimed asphalt pavement in the range of from 10 to 50 wt %, an amount of virgin aggregate in the range of from 50 to 90 wt %, and an amount of the rejuvenating agent or the composition in the range of from 2 to 6 wt %, wherein all weight percentages are based upon the total weight of the rejuvenated asphalt mix.

5. A process according to claim 1, wherein the rejuvenating agent comprises from 35 to 60 wt % palm oil and from 40 to 65 wt % bitumen.

6. A process according to claim 1, wherein the rejuvenating agent comprises at least 40 wt % palm oil and at least 40 wt % bitumen.

7. A rejuvenated asphalt pavement produced by a process according to claim 1.

8. A rejuvenated asphalt produced by a process according to claim 2.

9. A process according to claim 2, wherein the rejuvenating agent comprises from 35 to 60 wt % palm oil and from 40 to 65 wt % bitumen.

10. A process according to claim 3, wherein the rejuvenating agent comprises from 35 to 60 wt % palm oil and from 40 to 65 wt % bitumen.

11. A process according to claim 4, wherein the rejuvenating agent comprises from 35 to palm oil and from 40 to 65 wt % bitumen.

12. A process according to claim 2, wherein 90 wt % of the rejuvenating agent comprises at least 40 wt % palm oil and at least 40 wt % bitumen.

13. A process according to claim 3, wherein the rejuvenating agent comprises at least 40 wt % palm oil and at least 40 wt % bitumen.

14. A process according to claim 4, wherein the rejuvenating agent comprises at least 40 wt % palm oil and at least 40 wt % bitumen.

15. A process according to claim 5, wherein 90 wt % of the rejuvenating agent comprises at least 40 wt % palm oil and at least 40 wt % bitumen.

16. A rejuvenated asphalt pavement produced by a process according to claim 2.

17. A rejuvenated asphalt pavement produced by a process according to claim 3.

18. A rejuvenated asphalt pavement produced by a process according to claim 4.

19. A rejuvenated asphalt mix produced by a process according to claim 2.

20. A rejuvenated asphalt mix produced by a process according to claim 3.

21. A composition, comprising:
    a rejuvenating agent, comprising bitumen, having a penetration value in the range of from 10 to 300 1/10 mm at 25° C., as measured in accordance with EN 1426, and palm oil; wherein the ratio of said bitumen and said palm oil in said rejuvenating agent is such as to provide said rejuvenating agent having a viscosity in the range of from 200 cSt to 60,000 cSt at 60° C. but with said palm oil being present in said rejuvenating agent in an amount in the range of from 10 to 90 weight % of said rejuvenating agent and said bitumen being present in said rejuvenating agent in an amount in the range of from 10 to 90 weight % of said rejuvenating agent.

22. A composition as recited in claim 21, wherein said rejuvenating agent of said composition further comprises a polymer selected from the group consisting of styrenic block copolymers, olefinic copolymers, polyurethane and polyether-polyester copolymers present in said rejuvenating agent in an amount in the range of from 3 to 15 wt % of said rejuvenating agent.

23. A composition as recited in claim 22, further comprising: milled asphalt pavement.

24. A composition as recited in claim 23, further comprising:
   virgin aggregate, wherein said virgin aggregate is present in said composition in an amount in the range of from 10 to 50 wt % of said composition, and wherein said milled asphalt pavement is present in said composition in an amount in the range of from 50 to 90 wt % of said composition, and wherein said rejuvenating agent is present in said composition in an amount in the range of from 2 to 6 wt % of said composition.

25. A composition as recited in claim 21, further comprising:
   milled asphalt pavement present in said composition in an amount in the range of from 50 to 90 wt % of said composition;
   virgin aggregate present in said composition in an amount in the range of from 10 to 50 wt % of said composition; and
   wherein said rejuvenating agent is present in said composition in an amount in the range of from 2 to 6 wt % of said composition.

26. A composition as recited in any one of claims 21-25, wherein the amount of said rejuvenating agent in said composition is in the range of from 0.2 wt % to 2 wt % of said composition.

27. A composition as recited in any one of claims 21-25, wherein said penetration value of said bitumen is in the range of from 50 to 100 1/10 mm at 25° C.

28. A composition as recited in any one of claims 21-25, wherein said viscosity of said rejuvenating agent is in the range of above 350 cSt and below 750 cSt at 60° C.

29. A composition as recited in any one of claims 21-25, wherein said viscosity of said rejuvenating agent is in the range of above 400 cSt and below 600 cSt at 60° C.

30. A composition as recited in any one of claims 21-25, wherein said viscosity of said rejuvenating agent is in the range of from 4000 cSt to 40,000 cSt at 60° C.

31. A composition as recited in any one of claims 21-25, wherein said palm oil being present in said rejuvenating agent in an amount in the range of at least 20 wt % and less than 80 wt % of said rejuvenating agent and said bitumen being present in said rejuvenating agent in an amount in the range of at least 20 wt % and less than 80 wt % of said rejuvenating agent.

32. A composition as recited in any one of claims 21-25, wherein said palm oil being present in said rejuvenating agent in an amount in the range of at least 30 wt % and less than 70 wt % of said rejuvenating agent and said bitumen being present in said rejuvenating agent in an amount in the range of at least 30 wt % and less than 70 wt % of said rejuvenating agent.

33. A composition as recited in any one of claims 21-25, wherein said palm oil being present in said rejuvenating agent in an amount in the range of at least 40 wt % and less than 60 wt % of said rejuvenating agent and said bitumen being present in said rejuvenating agent in an amount in the range of at least 40 wt % and less than 60 wt % of said rejuvenating agent.

34. A process, comprising:
   milling an asphalt pavement to provide a milled asphalt pavement;
   mixing with said milled asphalt pavement to thereby provide a rejuvenated asphalt mixture, a juvenating agent, wherein said rejuvenating agent comprises bitumen, having a penetration value in the range of from 10 to 300 1/10 mm at 25° C., as measured in accordance with EN 1426, and palm oil, and wherein the ratio of said bitumen and said palm oil in said rejuvenating agent is such as to provide said rejuvenating agent having a viscosity in the range of from 200 cSt to 60,000 cSt at 60° C. but with said palm oil being present in said rejuvenating agent in an amount in the range of from 10 to 90 weight % of said rejuvenating agent and said bitumen being present in said rejuvenating agent in an amount in the range of from 10 to 90 weight % of said rejuvenating agent; and
   forming a rejuvenated asphalt pavement with said rejuvenated asphalt mixture.

35. A process as recited in claim 34, wherein said rejuvenating agent further comprises a polymer selected from the group consisting of styrenic block copolymers, olefinic copolymers, polyurethane and polyether-polyester copolymers present in said rejuvenating agent in an amount in the range of from 3 to 15 wt % of said rejuvenating agent.

36. A process as recited in claim 35, wherein virgin aggregate is also mixed with said milled asphalt pavement in said mixing step and in an amount so as to thereby provide from 10 to 50 wt % of said virgin aggregate in said rejuvenated asphalt mixture, and wherein said milled asphalt pavement is present in said rejuvenated asphalt mixture in an amount in the range of from 50 to 90 wt % of said rejuvenated asphalt mixture, and wherein said rejuvenating agent is present in said rejuvenated asphalt mixture in an amount in the range of from 2 to 6 wt % of said rejuvenated asphalt mixture.

37. A process as recited in any one of claims 34-36, wherein the amount of said rejuvenating agent in said rejuvenated asphalt mixture is in the range of from 0.2 wt % to 2 wt % of said rejuvenated asphalt mixture.

38. A process as recited in any one of claims 34-36, wherein said penetration value of said bitumen is in the range of from 50 to 100 1/10 mm at 25° C.

39. A process as recited in any one of claims 34-36, wherein said viscosity of said rejuvenating agent is in the range of above 350 cSt and below 750 cSt at 60° C.

40. A process as recited in any one of claims 34-36, wherein said viscosity of said rejuvenating agent is in the range of above 400 cSt and below 600 cSt at 60° C.

41. A process as recited in any one of claims 34-36, wherein said viscosity of said rejuvenating agent is in the range of from 4000 cSt to 40,000 cSt at 60° C.

42. A process as recited in any one of claims 34-36, wherein said palm oil is present in said rejuvenating agent in an amount in the range of at least 20 wt % and less than 80 wt % of said rejuvenating agent and said bitumen is present in said rejuvenating agent in an amount in the range of at least 20 wt % and less than 80 wt % of said rejuvenating agent.

43. A process as recited in any one of claims 34-36, wherein said palm oil is present in said rejuvenating agent in an amount in the range of at least 30 wt % and less than 70 wt % of said rejuvenating agent and said bitumen is present in said rejuvenating agent in an amount in the range of at least 30 wt % and less than 70 wt % of said rejuvenating agent.

44. A process as recited in any one of claims 34-36, wherein said palm oil is present in said rejuvenating agent in an amount in the range of at least 40 wt % and less than 60 wt % of said rejuvenating agent and said bitumen is present in said rejuvenating agent in an amount in the range of at least 40 wt % and less than 60 wt % of said rejuvenating agent.

* * * * *